Dec. 4, 1951                B. SAMSON ET AL                2,577,275
         METHOD OF AND APPARATUS FOR MAKING CONCRETE
                    ROOFING TILES OR THE LIKE
Filed Nov. 7, 1947                              3 Sheets-Sheet 1

INVENTORS
BLENNARD SAMSON
& WILLIAM C. SAMSON
By Young, Emery & Thompson
Att'ys-

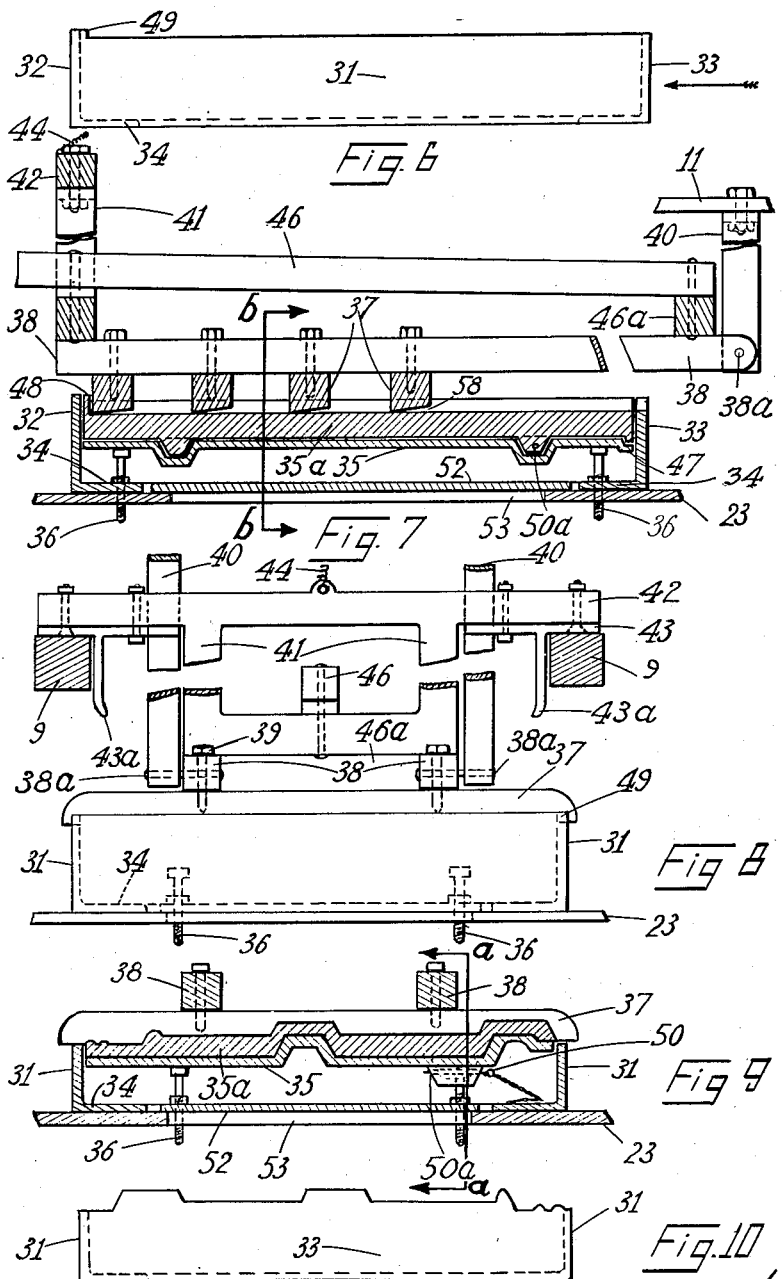

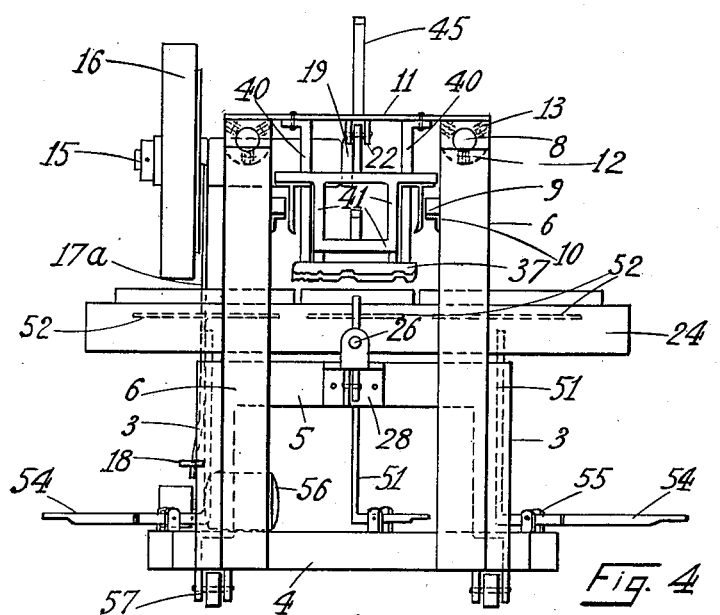
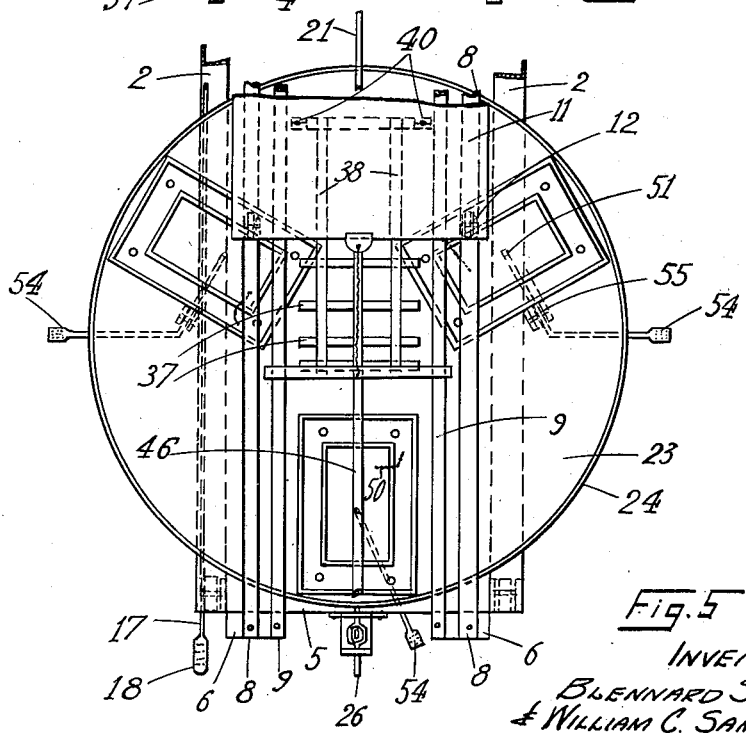

UNITED STATES PATENT OFFICE 2,577,275

METHOD OF AND APPARATUS FOR MAKING CONCRETE ROOFING TILES OR THE LIKE

Blennard Samson and William Charles Samson, Dunedin, Otago, New Zealand

Application November 7, 1947, Serial No. 784,630
In New Zealand April 18, 1946

10 Claims. (Cl. 25—43)

This invention relates to a method of and apparatus for manufacturing roofing tiles and articles of tile or slab formation of concrete or of similar material.

The object of the invention is to enable the tiles to be produced by a method and apparatus which will provide increased speed with a considerable lessening of the manual labour and the consequent physical fatigue on the part of the operator and which will also enable a tile to be efficiently tamped and surfaced during the moulding operation.

The method of producing the tiles in accordance with the invention consists in subjecting the material within a mould to a tamping and smoothing or strickling action by means of a plurality of assembled bars herein termed "Stricklebars" against the material during a period of relative movement between the strickle bar assembly and the mould in which the material is moulded.

The apparatus to carry out the above method comprises a strickle bar assembly, including the essential framework to carry a number of the said bars which extend over the mould transversely to the path of the relative reciprocal movement between the mould containing the material and the bar assembly and which have their working faces conforming to the contour of the tile face over which the bars extend, the said assembly being mounted in such a manner above the mould that the bars can be actuated downwardly under the control of an operator to provide a series of tamping and smoothing or strickling actions on the surface of the material during the period of the relative reciprocal movement.

A preferred method of obtaining the relative reciprocal movement between the mould and the assembly is to attach the latter to a reciprocating carriage guided longitudinally in alignment with the mould and actuated by approved mechanism driven from a source of power and clutch controlled. In order to provide for the downward movement of the bars for the tamping operation the assembly is pivotally attached to the carriage at one end while its free end would be guided longitudinally and limited in its downward movement to a plane corresponding to the finished face of the tile but free to be raised clear thereof. Means such as a lever extends outwards from the frame in order that the downward movement of the bars may be manually controlled and actuated.

After the final depth or thickness of the tile has been obtained by the requisite tamping the assembly may be retained at its lowest position so that the strickle bars will glide over the surface in a sliding action to provide the finishing or smoothing of the tile face. To ensure the latter object the underside of the strickle bars are bevelled or sloped towards one side in order to ensure that they will glide over the tamped material during the final smoothing process without raising the material.

The moulds would be secured on a table and are in the form of suitable boxes arranged in the path of the reciprocating frame so that the strickle bars at one end of their stroke will contact the material at a pre-determined point within an end wall of the box, and by the time the other end of their stroke is reached will have completely passed over the tile and clear of the mould box.

Ejector means under the control of the operator would be arranged to raise the pallet with the tile thereon clear of its mould box on the completion of the operation.

In order to speed the production of the tiles a turntable may be combined with the apparatus to carry a number of moulding boxes, and would be pivoted below the strickle bar assembly to rotate horizontally and convey the boxes to and away from the moulding position. The mould boxes, preferably three in number, would each be arranged over a respective opening in the table through which ejector means will operate to remove the pallet from the mould. Means are provided to lock the table in a stationary position with a box in working position, below the strickle bar assembly. By such arrangement a box may be loaded by an operator, the table rotated to the tamping position, locked, and when the tile is completed released and rotated to a position over ejector mechanism, this movement of the table bringing the next loaded box into tamping position.

The invention and the manner in which it is to be performed will now be fully described with the aid of the accompanying drawings:

Figure 4 is a front elevation and drawn to a larger scale than Figures 1 and 2, and Figure 5 is a plan view projected from Figure 4 showing that portion of the machine which includes a turntable for carrying the mould boxes.

Figure 6 is a side elevation of the tile moulding box for use with the machine.

Figure 7 is a longitudinal sectional elevation through the strickle bar assembly and supporting frame thereof and also through the mould box showing the strickle bars operating against the face of tile forming material within the box, the section being taken on line a—a of Figure 9.

Figure 8 is a front elevation of the moulding box and of the strickle bar assembly including the frame for supporting the assembled bars.

Figure 9 is a cross sectional elevation through the moulding box and its pallet, showing a strickle bar traversing the mould in its operative position for forming the upper face of a tile, the section being taken on line b—b of Figure 7.

Figure 10 is an elevation of the rear end of a moulding box viewed in the direction of the arrow in Figure 6.

In Figures 6 to 10 of the drawings there is included a mould box 31 which is suitable for use with the apparatus and which would be secured on a stationary or on a movable table according to the type of machine with which the apparatus will be used. The box contains a pallet 35 which is shaped on its upper face to mould the lower side of the tile and is adjustable in height by means of studs 36 screwing through inwardly directed bottom flanges 34 of the box.

Figure 1:
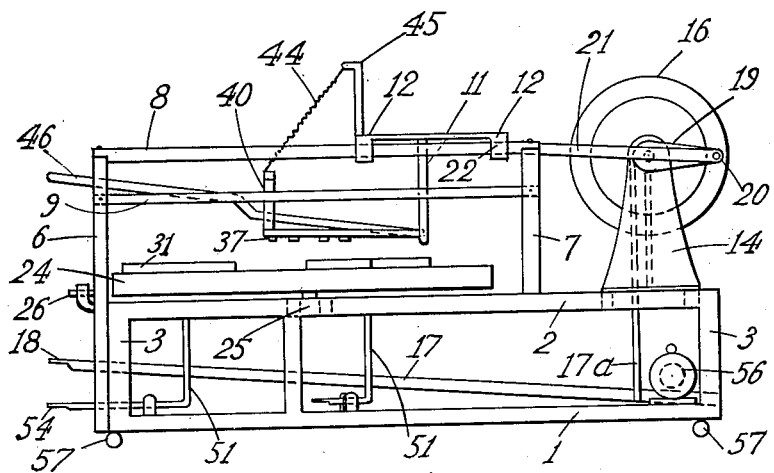
Figure 1 is a side elevation.
Figure 2:
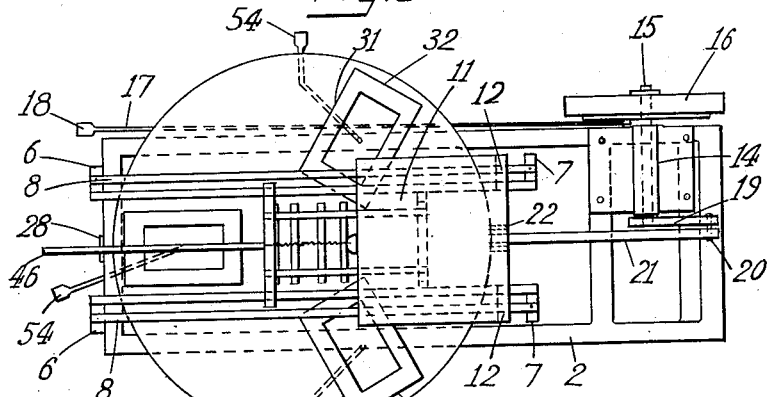
Figure 2 is a plan view showing the general arrangement of a machine embodying the apparatus for carrying out the invention.

The assembly for forming the upper face of the tile by tamping and smoothing comprises a number of bars 37, which as hereinbefore mentioned are termed "strickle bars" which are arranged transversely to a mould box 31 and which are attached by studs 39 to longitudinal members 38 pivoted on pins 38a at their rear ends to depending arms 40 from a reciprocating carriage 11 guided longitudinally on guide rods 8 as shown in Figures 1, 2 and 5. The other or forward ends of the members 38 are rigidly secured to the lower side of an open frame like member 41 having laterally projecting extensions 42 which run on guide members 9 of square section and limit the downward movement of the strickle bars against the material 35a within the mould box.

A lever handle 46 secured to a transverse bar 46a attached across the members 38 near their point of pivoting enables the strickle bar assembly to be depressed against the tension of a suspension spring 44 (see Figures 1 and 8) which is attached to the frame members 41 and to a post 45 on the carriage and normally tends to raise the frame and the strickle bars clear of the mould and of the material therein. The contact faces of the bars 37 are feathered, i. e. at a sloping direction from the face of the tile as shown at 58 in Figure 7, and in a direction to provide for a levelling and smoothing operation on the face of the tile as will be further explained. The amount of the slope may be varied according to the nature of the material used, generally the best slope being found by experiment. A suitable material for the bars would be cast iron treated to provide the requisite hardness to withstand as much as possible the wear due to their frictional contact with the material during the operation.

The working under face of each strickle bar is shaped in accordance with the cross contour of the face of the tile being moulded, a usual contour being shown in Figure 9.

The undersides of the projecting ends 42 of the strickle bar frame are provided with wearing strips 43 with depending tongues 43a to act as lateral guides against the guide members 9. When the strickle bars are resting lightly on or nearly touching the moulding box upper edges the wearing strips on the extensions 42 will be bearing on the guide members as shown in Figure 8 and will limit the downward movement of the bars to this position.

The mould box is secured on its table and positioned in relation to the assembly so that the full stroke of the reciprocating strickle bars 37 will pass over the length of the tile from the position behind the rib 48 and clear of the mould box end which as shown in Figure 10 is shaped to conform to the contour of the bars to permit the bars to pass clear of the mould. Approved mechanical means for reciprocating the carriage 11 are shown in Figures 1 and 2 from which it will be seen that the carriage is connected by a rod 21 to a crank 19 on a crank shaft 15 mounted in a pedestal bearing 14 fixed to the base frame which is formed of the horizontal members 1 and 2 joined by end members 3. The connecting rod 21 is pivoted to the carriage 11 at 22 and at 20 to the crank 19, the shaft 15 being driven by an electric motor 56 which may be connected by direct belt drive (not shown) or by other suitable means, to the pulley 16 forming one part of a clutch device of known form, the other part of the clutch being connected by a link 17a (Figures 1 and 4) to a lever 17 extending to the front of the machine and having a foot pedal 18 to enable the operator easily to start and to stop the carriage while attending to the tamping lever handle 46.

The reciprocating carriage 11 in the form of a flat plate is guided on the bars 8 which are attached to vertical columns 6 and 7 secured on the base frame of the machine, the column 6 being attached to the end members 3 thereof and the column 7 attached to the upper horizontal member 2. Three rollers 13 carried in bearing lugs 12 on the under side of the carriage plate 11 and indicated in dotted lines in Figure 4 are arranged to contact the guide bars 8 and to roll thereon and provide a suitable form of roller bearing between the carriage and the rods. The guide members 9 for the strickle bar assembly are also attached to the upright columns 6 and 7 by brackets 10 (see Figure 4).

Where a rib as at 48 in Figure 7 is required to form the usual headlock, the mould is located in relation to the strickle bar assembly so that on the extreme end of the forward stroke thereof the first bar will be clear of the end of the mould box end wall by the thickness of the rib. By lowering the strickle bar assembly quickly while at the extreme end of its forward stroke, the first bar will cut into the material piled in the mould to neatly and quickly form the rib 48. Surplus material above the rib and the wall may be cleaned off with a trowel. To provide a toe at the end of the tile on its under side the pallet is shaped as at 47 in Figure 7.

With the requisite amount of material loaded into the mould box 31 and on to the pallet 35 therein, the carriage 11 is caused to reciprocate by the operator through the medium of the foot lever 18 on the lever 17 in order to bring that part of the clutch controlled by the said lever 17 and its link into engagement with the pulley and thereby to rotate the crank shaft 15. He then, by means of the tamping lever handle 46, will lower the strickle bar assembly against the tension of the spring 44 to bring the working faces of the bars 38 against the material within the mould box in a succession of tamping actions during the reciprocal movement. If desired, or necessary, the operator by releasing the clutch can stop the reciprocating movement of the strickle bar assembly and use it for tamping at a particular position and thus he can perform a smoothing action with the strickle bars and intermittently, as desired, stop the movement thereof to tamp down any material pushed ahead of the bars in the smoothing movement. After the material has been sufficiently tamped so that the box is thoroughly packed and the surface of the material levelled to the contour required the surface of the title is smoothed and finished by the operator lowering the assembly and thus the strickle bars sharply on to the material at a time when the said bars are at their extreme position of a forward stroke and by retaining them in that position during the full backward stroke, that is, the stroke in the direction of the arrow in Figure 7. On the return forward stroke the bars are raised clear of the tile face, this smoothing action on a backward stroke being repeated until such time that the required smoothness is imparted to the tile face.

Upon the completion of the smoothing action the movement of the carriage 11 is stopped, by the operation of lever 17a and the pallet with the tile thereon removed by suitable ejector means comprising a member 51 pivoted in the framing of the machine at 55 and adapted to contact an ejector plate 52 lying beneath the pallet on the mould box. The ejector means will be again referred to below.

The invention above described may be operated by the use of one mould box on a stationary table but it is proposed to use in combination with the apparatus described a turntable to carry a plurality of the mould boxes each of which will be brought in succession into position beneath the strickle bars for the tamping and smoothing operations. Ejector means may be provided on the machine in relation to one or each of the stationary positions of the mould boxes in order that the tile may be ejected either at the position of the tamping or at any one of the other stationary positions of the mould boxes.

The structure of a machine including such a turntable, for carrying out the moulding operations therewith will now be described.

Figure 3:
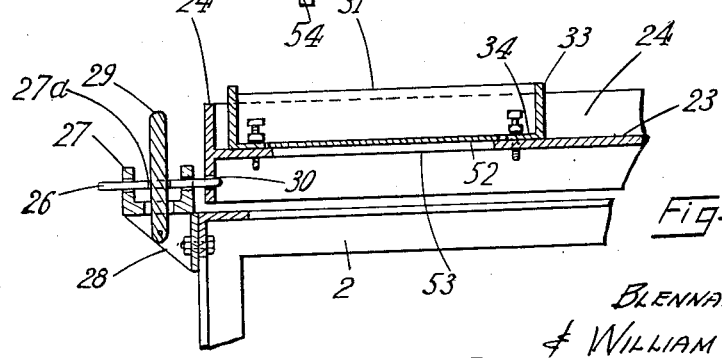
Figure 3 is a detail sectional elevation of a portion of a turntable showing locking means therefor.

The turntable on which a number of the mould boxes are supported comprises a circular plate 23, this reference numeral also serving to designate the turntable, which has a vertical rim rising from and also depending from its peripheral edge as shown in Figure 3. The table is pivoted axially to rotate horizontally in a bearing 25 provided in the frame base with suitable friction washers for supporting it.

In the embodiment shown the turntable is operable in its turning movement manually but may be rotated by any suitably controlled mechanical means under power.

The mould boxes 31, three in number, but a lesser or greater number may be used, are secured to the plate 23 in a radially disposed position as indicated in Figure 5. The mould boxes are secured by their internal flanges 34 by screws or welding or other suitable known means. The adjusting studs 33 for the pallets are threaded through the flange and the table plate 23.

When a mould box is to be brought into tamping position below the strickle bars the turntable is rotated and retained in that position during the tamping operation by a turret pin 26 (see Figure 3) slideable in holes in the vertical lugs 27 of a bracket 28 bolted to the base frame 2 and adapted to enter holes 30 in the depending part of the table rim 24. Each hole 30 is disposed on the radial line passing through the mould boxes so that when the pin 26 enters a hole 30 the turntable is locked in a position with a mould box beneath the strickle bars. The locking and release of the turntable is manually controlled by a handle 29 pivoted in the bracket 28 and passing upwardly through a slot 27a in the pin 27.

The means for ejecting the pallets from the mould boxes after tamping and finishing of the tile face is completed consists of a vertical ejector member 51 right angled at its lower end to form a foot lever 54 and is pivotally mounted in a bracket 55 on the base frame. The upper end of the ejector member 51 would normally lie beneath the turntable plate 23 below an opening 53 therein which is normally covered by an ejector plate 52 lying within the internal flange 34 of the mould box. By the downward movement of the foot lever 54, the ejector member 51 is raised, contacts the ejector plate 52, and carries this plate upwards against the under side of the pallet 35, which is thereby raised above the sides of the mould box so that it may be removed or conveyed from the machine. In the machine shown and described the pallet ejector means are provided at each of the three stationary positions of the turntable. This enables an operator with two assistants to increase the speed of production whereby the mould box may be loaded by one assistant at one stationary position for example that shown on the right hand side of the machine in Figure 5, from which position it will be carried by the table on the manual rotation thereof to the position over which the strickle bars reciprocate.

After the operation of forming the tile is completed and the turntable again rotated, the box with its completed tile passes to the next position, i. e. that shown on the left hand side of the machine, where the second assistant removes the pallet and the tile thereon by means of the ejector member 51, located at that position.

In the case of one operator using the machine a mould box would be loaded at any one of the positions indicated in Figure 5.

If the box in line with the strickle bar assembly is selected, the operator will, while standing at the front of the machine be able to press the clutch lever to start the movement of the strickle bars and after the completion of the tamping operation, may while still in the same position by the use of the foot lever 54 at that position eject the pallet and tile from the box without having to move the turntable. Three ejector devices are provided so that the pallet 35 can be lifted out at any station. By this provision it is possible to rotate the turntable 23 and have the unloading station at either side of the central station where the strickle bar assembly is located. There are numerous advantages in this arrangement, one of which would be in stacking up the tiles as they are taken from the machine wherein it might be easier to alternate the loading and unloading stations. Also at any station it might be desired to raise the pallet 35 because of faulty placing in the mould or for some other reason and consequently it is desirable to have an ejector device at each station. It is of course obvious that an ejector device is provided at the central forming station so that if the machine is being operated by one man only he can carry out all the operations at that station. It is also clear why an ejector device is necessary at the unloading station when there are three men working at the machine.

A pin 50 on a length of chain is secured to each moulding box and is passed through a hole in the pallet to form the usual tying wire hole 50a in a projection on the under side of the tile as in Figure 7.

The whole machine may be mounted on small ground wheels 57 so that the machine can be moved along the floor as required to stack the tiles coming off the machine.

Colouring material such as a liquid raddle may be splashed on to the tile face during the operation and the movement of the strickle bars will spread the colour evenly.

We claim:

1. A method of manufacturing roofing tiles and like articles of tile or slab formation of concrete or similar material, comprising the steps of loading the material into a mould, imparting a reciprocal movement between a strickle bar assembly and the mould, tamping the material into the mould by the strickle bars during the reciprocal movement, and smoothing the material in the mould after the tamping of the material in the mould.

2. The method of manufacturing roofing tiles and the like according to claim 1, in which the strickle bars are retained against the face of the material during the period of the relative movement between the strickle bars and the mould in one direction to subject the material to a final smoothing action.

3. The method for manufacturing roofing tiles and the like according to claim 1, in which the tamping and smoothing actions to which the face of the tile material is subjected are obtained by directing the bars over the mould transversely to the path of the reciprocal movement between the bar assembly and the mould.

4. Apparatus for forming roofing tiles and the like, comprising a mould, a number of strickle bars assembled into a unit to shape, tamp and smooth the tiles, means to impart a reciprocal relative movement between the assembled bars and the mould, means by which the bars of the unit are actuated downwardly against the surface of the material in a series of tamping movements during the period of reciprocal movement to tamp, shape and smooth the surface of the tile to be produced, the unit being pivotally mounted at one end, and means by which the other end of the unit is limited in its downward movement against the material in the mould.

5. Apparatus for forming roofing tiles and the like, comprising a mould, a number of strickle bars assembled into a unit to shape, tamp and smooth the tiles, means to impart a reciprocal relative movement between the assembled bars and the mould, means by which the bars of the unit are actuated downwardly against the surface of the material in a series of tamping movements during the period of reciprocal movement to tamp, shape and smooth the surface of the tile to be produced, and the strickle bar unit including a frame having the strickle bars fixed on the underside thereof and extending over the mould transversely to the direction of the relative movement between the unit and the mould.

6. Apparatus for forming roofing tiles and the like, comprising a mould, a number of strickle bars assembled into a unit to shape, tamp and smooth the tiles, means to impart a reciprocal relative movement between the assembled bars and the mould, means by which the bars of the unit are actuated downwardly against the surface of the material in a series of tamping movements during the period of reciprocal movement to tamp, shape and smooth the surface of the tile to be produced, and each strickle bar being bevelled or sloped on its underside or working face in relation to the mould so that it will slide over the material during the smoothing operation.

7. Apparatus for forming roofing tiles and the like, comprising a mould, a number of strickle bars assembled into a unit to shape, tamp and smooth the tiles, means to impart a reciprocal relative movement between the assembled bars and the mould, means by which the bars of the unit are actuated downwardly against the surface of the material in a series of tamping movements during the period of reciprocal movement to tamp, shape and smooth the surface of the tile to be produced, the strickle bar unit including two longitudinal members to the underside of which the strickle bars are attached and which are pivoted at one end in means for supporting the unit, and an open frame-like member is provided to which the other ends of said longitudinal members are fixed, said frame-like member having lateral extensions to contact a rigid part to limit the downward movement of the unit to the face of the tile but to permit it to be raised therefrom.

8. Apparatus for forming roofing tiles and the like, comprising a mould, a number of strickle bars assembled into a unit to shape, tamp and smooth the tiles, means to impart a reciprocal relative movement between the assembled bars and the mould, means by which the bars of the unit are actuated downwardly against the surface of the material in a series of tamping movements during the period of reciprocal movement to tamp, shape and smooth the surface of the tile to be produced, and a movable carriage guide to which the strickle bar unit is pivoted in relation to the mould and connected to means for reciprocating said carriage over the mould.

9. Apparatus for forming roofing tiles and the like, comprising a mould, a number of strickle bars assembled into a unit to shape, tamp and smooth the tiles, means to impart a reciprocal relative movement between the assembled bars and the mould, means by which the bars of the unit are actuated downwardly against the surface of the material in a series of tamping movements during the period of reciprocal movement to tamp, shape and smooth the surface of the tile to be produced, a movable carriage guide to which the strickle bar unit is pivoted in relation to the mould and connected to means for reciprocating said carriage over the mould, guide rods on which the carriage slides parallel with the path of the strickle bar unit, and a crank and a connecting rod by means of which the carriage is reciprocated.

10. A method of manufacturing roofing tiles and like articles of tile or slab formation of concrete or similar material, comprising the steps of loading the material into a mould, imparting a reciprocal intermittent movement between a strickle bar assembly and the mould, tamping the material into the mould by the strickle bars during the reciprocal movement, and smoothing the material in the mould after the tamping of the material in the mould by the intermittent movement of the assembly to smooth down any material pushed ahead by he bars.

BLENNARD SAMSON.
WILLIAM CHARLES SAMSON.

REFERENCES CITED

The following references are of record in the file of this patent:

UNITED STATES PATENTS

| Number | Name | Date |
|---|---|---|
| 897,771 | Olson | Sept. 1, 1908 |
| 1,182,061 | Trumble | May 9, 1916 |
| 1,268,226 | Flood | June 4, 1918 |
| 1,661,414 | Dunn | Mar. 6, 1928 |
| 1,733,706 | Widin | Oct. 29, 1929 |
| 1,768,141 | Pfeffer et al. | June 24, 1930 |
| 1,814,159 | Housman | July 14, 1931 |
| 1,915,475 | Richter | June 27, 1933 |
| 2,377,667 | Bole et al. | June 5, 1945 |

FOREIGN PATENTS

| Number | Country | Date |
|---|---|---|
| 421,096 | Great Britain | Dec. 13, 1934 |